United States Patent [19]

Marriott et al.

[11] 4,110,218

[45] Aug. 29, 1978

[54] LIQUID CLEANING APPARATUS HAVING CYCLONIC SEPARATORS

[75] Inventors: Roger Marriott; Mark R. Estabrook, both of Rockford, Ill.

[73] Assignee: Barnes Drill Co., Rockford, Ill.

[21] Appl. No.: 766,012

[22] Filed: Feb. 7, 1977

[51] Int. Cl.² .................. B01D 35/06; B03C 1/02; B03C 1/30
[52] U.S. Cl. ................. 210/223; 210/257 R; 210/259; 210/297
[58] Field of Search .............. 210/223, 526, 73 R, 210/104, 167, 171, 257 R, 259, 297, 389

[56] References Cited

U.S. PATENT DOCUMENTS

| 2,720,973 | 10/1955 | Gross | 210/1.5 |
|---|---|---|---|
| 2,720,974 | 10/1955 | Fowler | 210/1.5 |
| 2,861,688 | 11/1958 | Harms | 210/73 |
| 2,999,597 | 9/1961 | Harms | 210/333 |
| 3,341,983 | 9/1967 | Baldenhofer | 210/167 |
| 3,456,797 | 7/1969 | Marriott | 210/73 |
| 3,456,798 | 7/1969 | Urdanoff | 210/73 |
| 3,540,588 | 11/1970 | Estabrook | 210/73 |
| 3,840,120 | 10/1974 | Greenberg | 210/167 |
| 3,954,611 | 5/1976 | Reedy | 210/71 |

Primary Examiner—Charles N. Hart
Assistant Examiner—David R. Sadowski
Attorney, Agent, or Firm—Leydig, Voit, Osann, Mayer & Holt, Ltd.

[57] ABSTRACT

The liquid which is delivered to cyclonic separators for final cleaning is precleaned twice, first in a drag tank and then by a magnetic separator. The dirty underflow from the cyclonic separators is subjected to two stages of aftercleaning, first in a second drag tank and then by a fabric filter.

5 Claims, 5 Drawing Figures

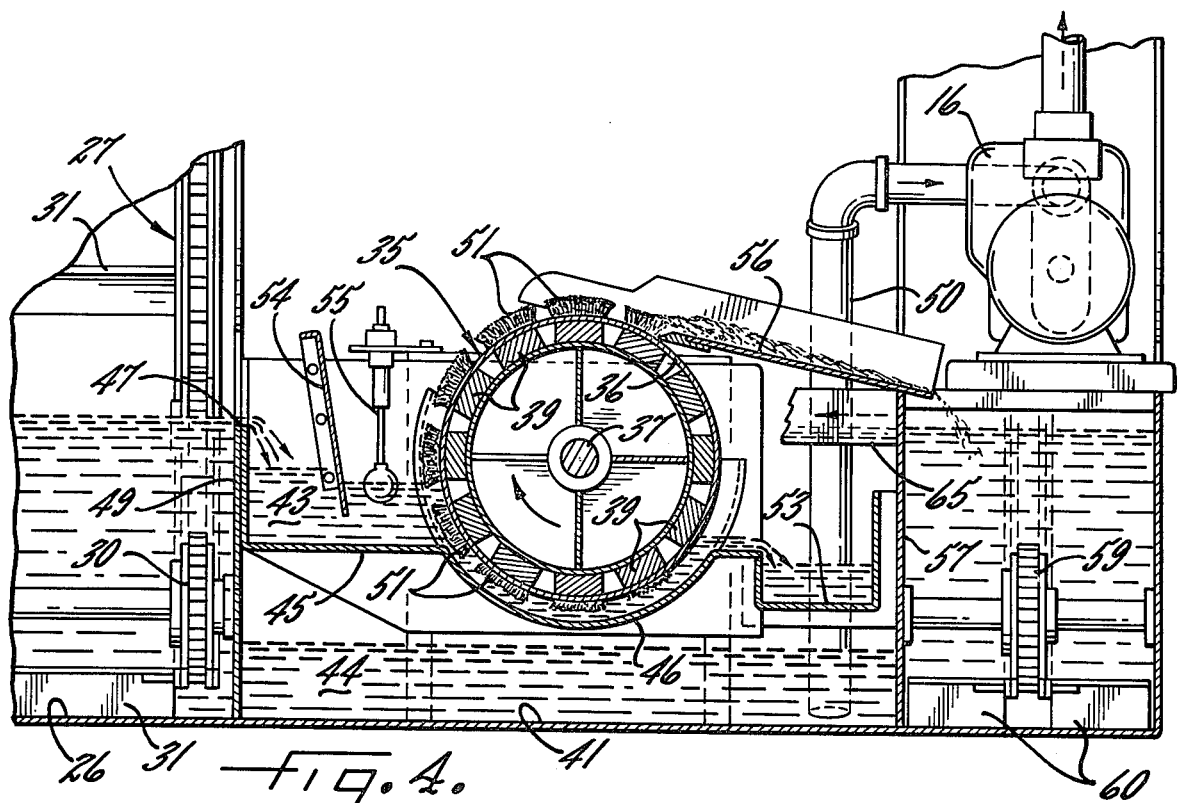
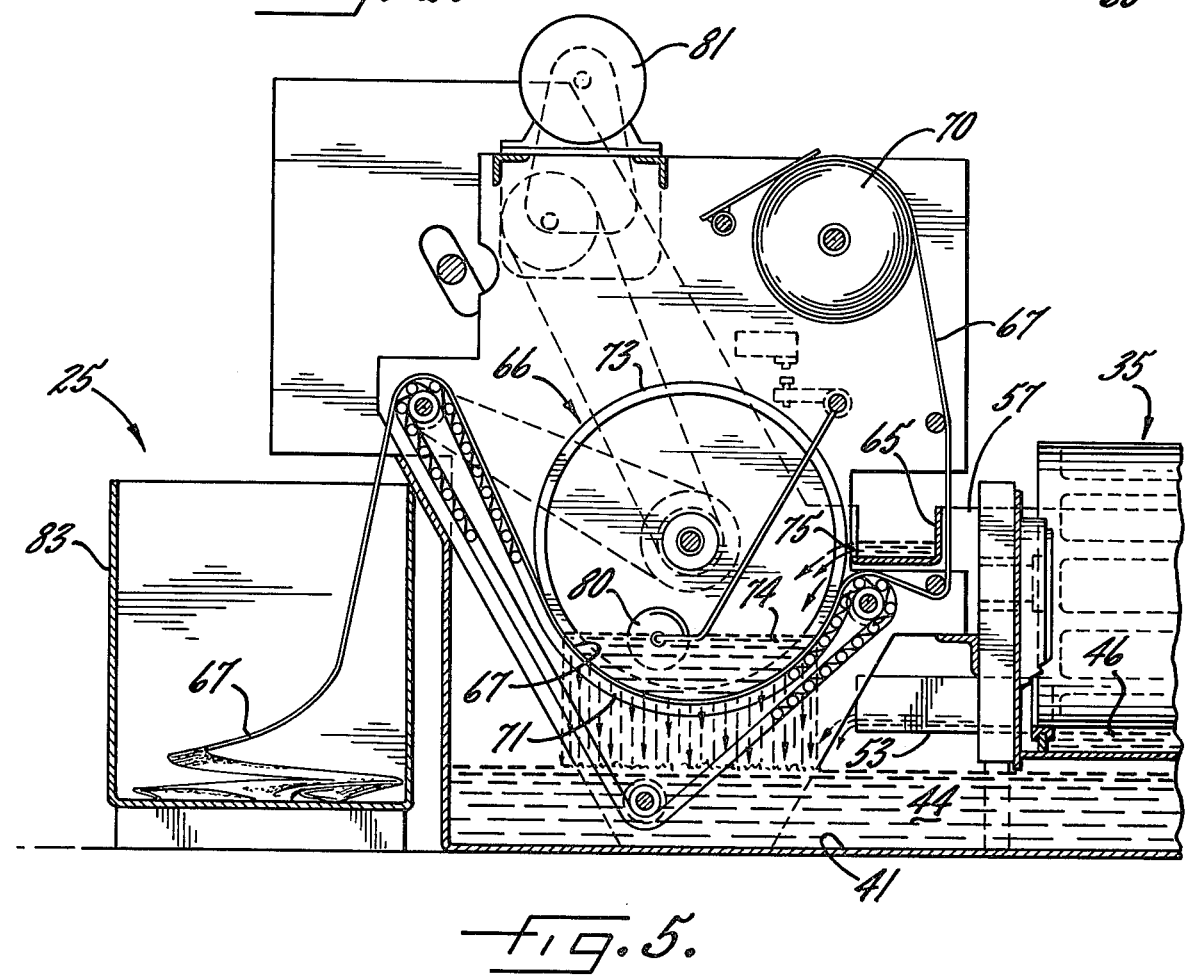

LIQUID CLEANING APPARATUS HAVING CYCLONIC SEPARATORS

BACKGROUND OF THE INVENTION

This invention relates to apparatus for separating particles from a flow of dirty liquid such as machine tool coolant. More particularly, the invention relates to apparatus in which final cleaning of the liquid is effected by a cyclonic separator which produces a clean flow of liquid and also discharges a downward stream of dirty liquid — commonly called underflow — which contains particles removed from the liquid delivered to the cyclonic separator.

Apparatus of this general type is disclosed in Marriott U.S. Pat. No. 3,456,797 and in Estabrook U.S. Pat. No. 3,540,588 and, in each instance, the incoming dirty liquid is precleaned prior to being delivered to the cyclonic separator in order to reduce damage to the pump which serves the separator. Also, the dirty underflow discharged from the cyclonic separator is cleaned before being recirculated, the cleaning of the underflow being referred to as aftercleaning and serving to reduce the recirculation of fines.

SUMMARY OF THE INVENTION

The general aim of the present invention is to provide apparatus of the foregoing type which effects precleaning of the dirty incoming liquid in at least two separate stages and further effects aftercleaning of the underflow in at least two additional separate stages so as to render the cyclonic separator more trouble-free in operation, to enable the cyclonic separator to produce a cleaner flow of clean liquid, and to provide for more effective disposal of the particles in the underflow.

A more detailed object is to provide apparatus in which precleaning of the dirty incoming liquid is effected in two stages by a drag tank and a magnetic separator and in which two-stage aftercleaning of the underflow is effected by an additional drag tank and by a filter which is especially adapted to remove fines from the liquid.

Another object is to arrange the two drag tanks, the magnetic separator and the filter in a unique manner to conserve floor space and to effect discharge of the particles collected by the tanks, the separator and the filter at a common collection area located at one end of the apparatus.

These and other objects and advantages of the invention will become more apparent from the following detailed description when taken in conjunction with the accompanying drawings.

BRIEF DESCRIPTION OF THE DRAWINGS

FIGS. 4 and 5 are enlarged fragmentary cross-sections taken substantially along the lines 4—4 and 5—5, respectively, of FIG. 2.

DETAILED DESCRIPTION OF THE PREFERRED EMBODIMENT

Figure 1:
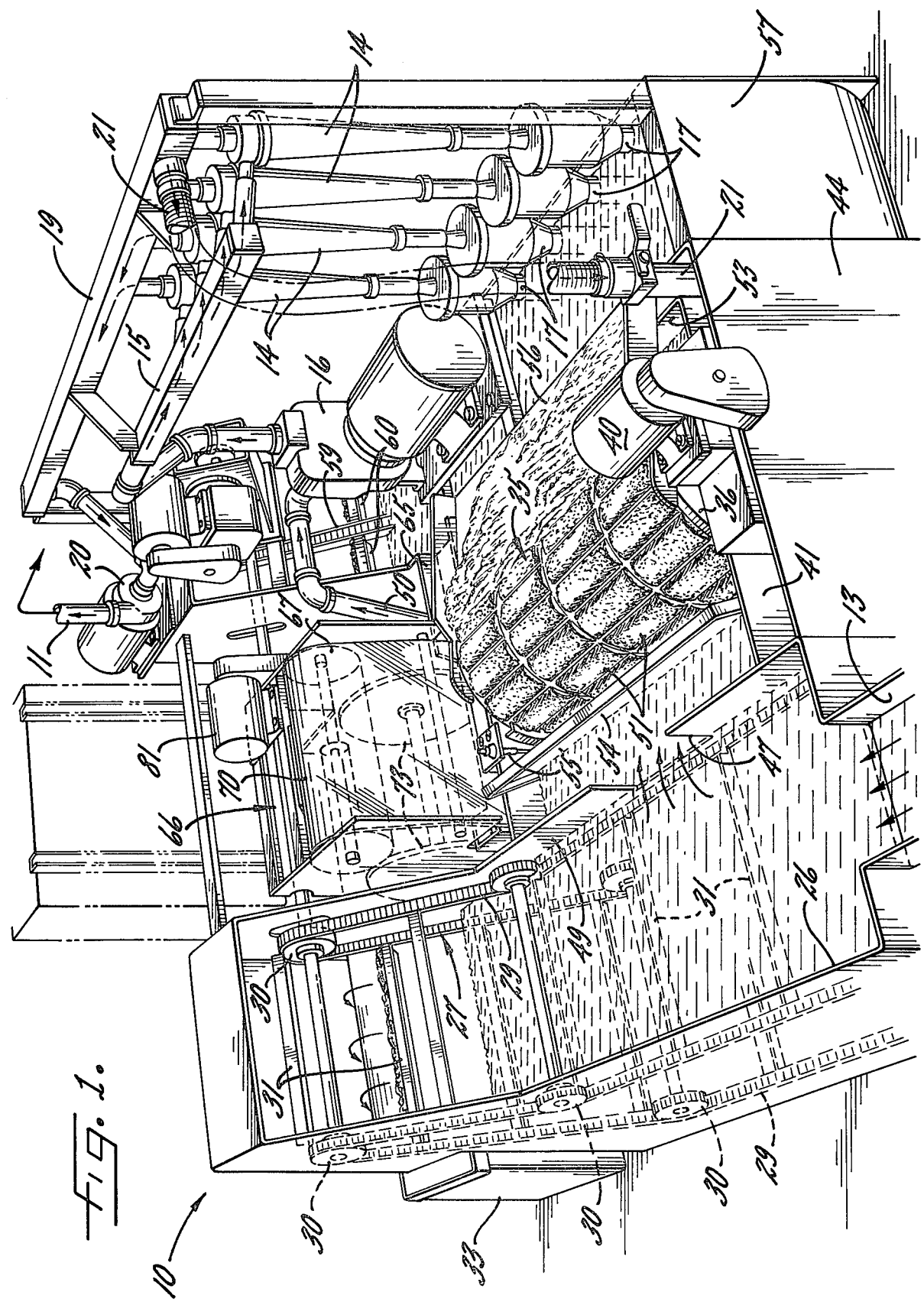
FIG. 1 is a perspective view of new and improved separating apparatus incorporating the unique features of the present invention.

As shown in the drawings for purposes of illustration, the invention is embodied in a coolant cleaning apparatus 10 for supplying one or more machines (not shown) with clean coolant through a pipe 11 and receiving dirty coolant through a return line 13 leading to the cleaning apparatus. The liquid in the return line may contain entrained magnetic and non-magnetic chips, worn-away abrasive particles from the tool or tools of the machine, and other non-magnetic contaminants such as particles of a bonding material for holding the abrasive particles of the tool. The exact composition, of course, varies with the type of tool being used and the type of workpiece being machined.

In general, the cleaning apparatus 10 includes one or more cyclonic separators 14 which may be of conventional construction. Coolant is pumped into a manifold 15 by a motor-driven pump 16 and is forced tangentially into the upper end of each cyclone, the latter including a generally conical chamber. The coolant spirals around the chamber while traveling progressively downwardly and, as a result, a centrifugal separating action is produced to cause the particles and denser contamination (commonly called underflow) to follow the conical chamber to a lower discharge spout 17. Clean coolant flows reversely or upwardly along the axis of the conical chamber and is directed into a clean coolant manifold 19. A clean coolant pump 20 communicates with the manifold 19 and delivers a flow of clean coolant to the machines through the line 11. In addition, a bypass flow of clean coolant is produced through a line 21. The bypass flow results from the fact that the output flow from the cyclonic separators 14 is always greater than the requirements of the using machines and thus there is always an excess or bypass flow of clean coolant which is returned directly to the cleaning apparatus 10.

The present invention more effectively solves two primary problems which have always existed with cyclonic separators such as the separators 14. The first problem involves the need to deliver relatively clean coolant to the separator pump 16 and to the separators themselves so as to avoid excessive wear of the pump and to increase the efficiency of the separators. In accordance with the present invention, this problem is met by precleaning the dirty coolant in at least two separate stages before the coolant is delivered to the pump 16 so that both heavy chips and comparatively large magnetic and non-magnetic particles are removed from the coolant prior to the coolant being supplied to the pump 16 and to the cyclonic separators 14. The second problem involves the removal of magnetic and non-magnetic fines from the underflow of the cyclonic separators and, pursuant to the invention, such removal is effected by subjecting the underflow to at least two additional cleaning stages, which may be referred to as aftercleaning stages. Accordingly, the coolant is subjected to at least two precleaning stages and to at least two aftercleaning stages. In addition, the particles which are removed from the coolant during each cleaning stage are discharged into a common collection area 25 (FIG. 2) at one end of the apparatus 10 so that all of the particles may be conveniently picked up for disposal at the same collecting area and thereby reduce the floor space required by the apparatus.

Figure 2:
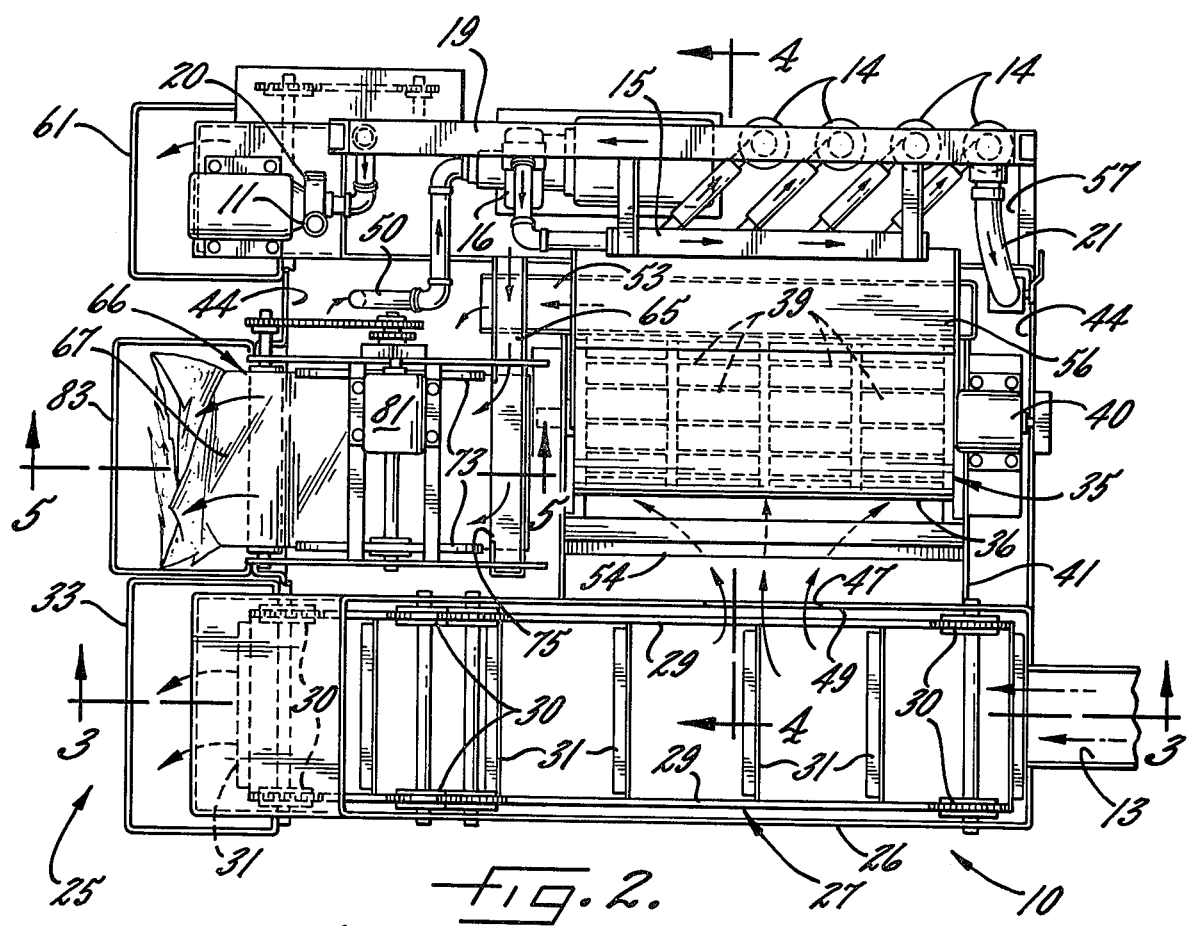
FIG. 2 is a plan view of the apparatus shown in FIG. 1.
Figure 3:
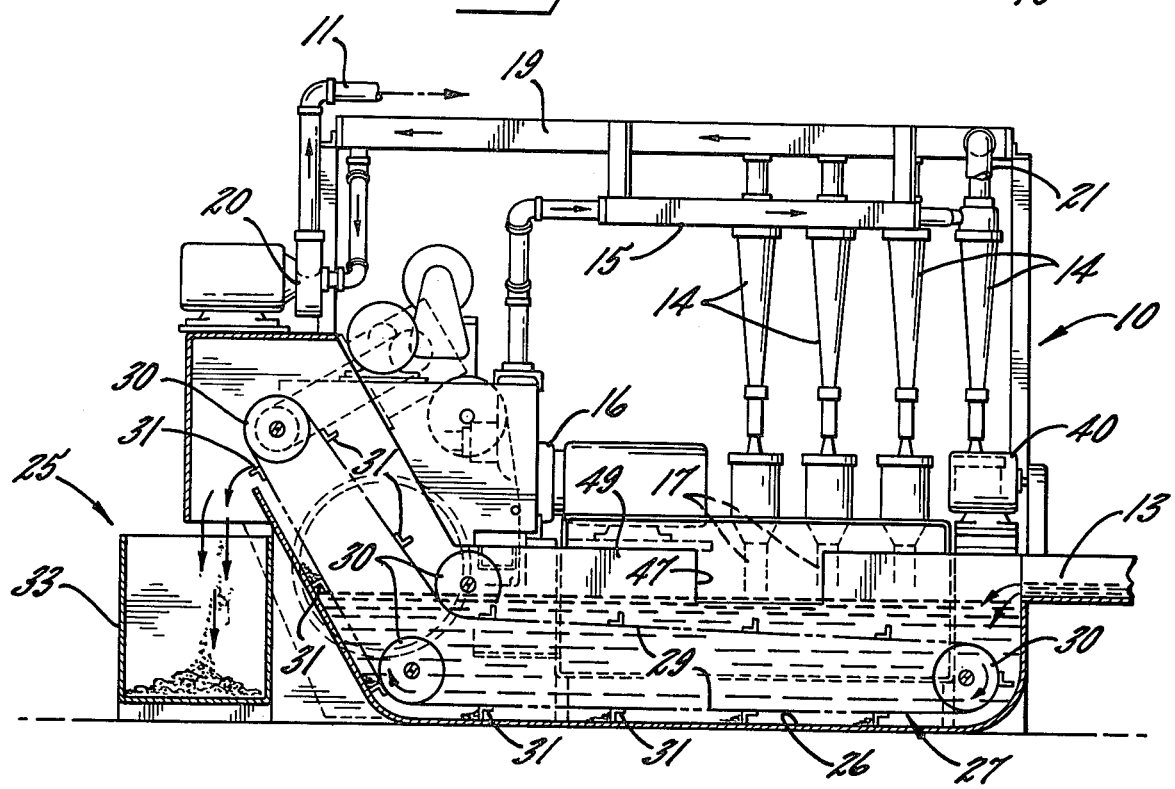
FIG. 3 is a fragmentary cross-section taken substantially along the line 3—3 of FIG. 2.

More specifically, the first precleaning stage is effected within a drag tank 26 (FIGS. 1 to 3) into which the dirty coolant from the machines is delivered by way of the line 13, the line herein being in the form of a trough. The coolant enters the tank at a relatively high rate such as 80 gallons per minute and is in a relatively turbulent state within the tank. In spite of the turbulence, extremely heavy chips settle from the coolant and sink toward the bottom of the tank. Such chips are picked up and removed from the tank by a drag conveyor 27 comprising a pair of chains 29 trained around several sets of sprockets 30 and carrying bars or flights 31 which are adapted to scrape up the chips from the bottom of the tank. One of the sets of sprockets 30 is power driven so as to advance the lower runs of the chains 29 from right to left as shown in FIG. 3 and thereby cause the lowermost flights 31 to scrape the bottom of the tank 26 and pick up the chips which have settled out from the incoming coolant. After scraping the bottom of the tank, each flight moves upwardly and discharges its chips into a container or bucket 33 located in the collection area 25 at one end of the apparatus 10 (see FIG. 3).

As a result of the drag conveyor 27, heavy chips are removed from the coolant in the tank 26 but such coolant still contains many magnetic and non-magnetic particles which are not sufficiently dense to sink to the bottom of the tank. Many of these particles are removed in the second precleaning stage which involves the use of a rotary magnetic separator 35 (FIGS. 1, 2 and 4).

As shown in FIG. 4, the magnetic separator 35 comprises a drum 36 rigidly connected to a shaft 37 and having a number of axially spaced sets of circumferentially spaced permanent magnets 39. A drive mechanism 40 (FIG. 1) is adapted to rotate the shaft intermittently to turn the drum step-by-step in a clockwise direction as viewed in FIG. 4.

The drum 36 of the magnetic separator 35 is located within a tank 41 (FIG. 4) which is divided into upper and lower compartments 43 and 44 by a partition 45 having an arcuate trough portion 46 which underlies the drum, the drum thus being located above the partition. The tank 41 is disposed side-by-side with the drag tank 26 and communicates with the latter by way of a weir 47 (FIG. 1) or notch formed in the common wall 49 of the two tanks. Accordingly, the weir 47 and the partition 45 define a flow path by which partially cleaned coolant in the drag tank 26 flows out of that tank, into the tank 41 and thence into the arcuate trough 46 and beneath the drum 36. The lower compartment 44 beneath the partition 45 defines a clean coolant reservoir into which the clean excess or bypass flow from the cyclonic separators 14 is discharged via the line 21. The pump 16 communicates with the clean reservoir 44 by way of an inlet pipe 50 (FIGS. 1 and 2) adjacent one end of the apparatus 10 and thus the coolant supplied to the cyclonic separators 14 is contained in the reservoir.

Magnetic and non-magnetic particles are picked up from the partially cleaned coolant flowing out of the drag tank 26 as such coolant flows into the trough 46 and beneath the drum 36. The drum normally is stationary and, as the coolant passes beneath the drum, the magnetic particles are attracted to the drum and begin to build up as swarf clumps 51 in the trough 46 (see FIG. 4). The clumps 51 of collected magnetic particles tend to clog the trough and, in so doing, they strain and collect some of the non-magnetic particles in the coolant flowing through the trough. Thus, the clumps contain magnetic particles as a result of their attraction to the drum and also contain non-magnetic particles as a result of the straining action of the magnetic particles. The cleaned coolant which passes through the trough and beneath the drum is discharged into a channel 53 (FIGS. 2 and 4) located at the downstream side of the trough and then flows into the clean coolant reservoir 44. Such coolant has been precleaned in two stages, first by the drag tank 26 and then by the magnetic separator 35.

As the swarf clumps 51 build up in size, they restrict the flow of coolant through the trough 46 and cause a rise in that coolant which is located in the upper compartment 43 upstream of the trough, there being a baffle 54 (FIGS. 1 and 4) between the trough and the weir 47 to more evenly distribute the flow of coolant along the full width of the trough 46. After the upstream coolant has risen to a predetermined level, a sensor — herein shown as a float 55 — detects the rise and actuates the drive mechanism 40 to index the drum 36 in a clockwise direction (FIG. 4) and move the most dense clumps 51 upwardly out of the trough 46 thereby to relieve the restriction and enable the coolant level in the compartment 43 to drop.

When the drum 36 is indexed, the swarf clumps 51 on the upper side of the drum are removed therefrom by a scraper which is in the form of a chute 56 (FIG. 4) having one edge disposed in engagement with the periphery of the drum. In carrying out the invention, the swarf in the chute 56 is discharged into a second drag tank 57 which is disposed side-by-side with the tank 41. A power-driven chain 59 (FIG. 4) is located within the second drag tank 57 and carries a series of bars or flights 60 which are adapted to move in the same direction as the flights 31 of the drag conveyor 27. Thus, the flights 60 scrape particles from the bottom of the tank 57 and discharge such particles into a bucket 61 (FIG. 2) in the collection area.

Further in keeping with the invention, the underflow from the discharge spouts 17 of the cyclonic separators 14 also is discharged into the second drag tank 57. Accordingly, the second drag tank contains the swarf from the magnetic separator 35 and also contains the coolant and the fine particles which make up the underflow from the cyclonic separators 14. The coolant in the second drag tank 57 is relatively quiet or non-turbulent when compared with the coolant in the first drag tank 26 since the flow rate into the second tank is substantially less than the flow rate into the first tank. Thus, the swarf and the particles from the underflow have a good opportunity to settle to the bottom of the tank 57 for removal by the flights 60. Accordingly, the underflow from the cyclonic separators 14 is subjected to a cleaning stage in the drag tank 57, this being the first aftercleaning stage and serving to separate some of the particles from the underflow.

The coolant in the second drag tank 57 is subjected to a second aftercleaning stage in order to remove those very fine particles which do not sink to the bottom of the drag tank. For this purpose, a trough 65 (FIGS. 2 and 5) communicates with the upper end of the drag tank 57 and defines a flow path to a separating means 66 which herein is shown as including an indexable web 67 of porous filter media such as paper or fabric. The coolant from the drag tank 57 spills over into the trough 65 and is delivered to the upper side of the web 67. Thereafter, the coolant is filtered through the web and delivered to the clean reservoir 44 while the fine particles in such coolant are strained and caught by the web.

More specifically, the filter web 67 initially is stored on a supply roll 70 (FIG. 5) and is guided and supported by a perforated endless conveyor which herein is in the form of a Cambridge belt 71. The web 67 and the belt 71 pass downwardly around the lower arcuate surfaces of a pair of rotatable wheels 73 which are located between the two drag tanks 26 and 57 and above the clean reservoir 44. The wheels seal the side margins of the web to the belt and serve to cause a pool 74 of coolant to form above the web. Coolant from the trough 65 spills into the pool 74 through an opening 75 in the trough. The coolant in the pool flows downwardly through the web and then into the clean reservoir 44 while the particles in such coolant are filtered out by the web. Accordingly, the underflow from the drag tank 57 is subjected to a second aftercleaning stage by the web 67 so as to remove fine particles from the underflow and to direct a relatively clean flow into the reservoir 44.

As the web 67 becomes clogged with particles, the coolant in the pool 74 rises and, when the pool reaches a predetermined level, a float 80 (FIG. 5) causes momentary actuation of a drive mechanism 81 which is operably connected to the Cambridge belt 71. Upon being actuated, the drive mechanism 81 advances the upper run of the belt 71 a short distance from right to left as shown in FIG. 5 in order to bring a clean length of web into position beneath the pool. That portion of the web having the collected particles thereon is advanced upwardly by the belt and is discharged into a bucket 83 located in the collection area 25.

To summarize the operation of the cleaning apparatus 10, dirty coolant from the using machines flows into the drag tank 26 by way of the trough 13 and is precleaned of heavy chips and particles. The coolant then flows into the tank 41 and is again precleaned of both magnetic and non-magnetic particles by the magnetic separator 35. The coolent which flows past the separator is discharged into the clean reservoir 44 and constitutes the dirtiest liquid in the reservoir.

Coolant in the clean reservoir 44 is sucked upwardly therefrom by the pump 16 and is delivered to the cyclonic separators 14. Since such coolant has been precleaned at least twice, the pump is subjected to less wear and the cyclonic separators are not as heavily loaded as would be the case if the coolant contained a high concentration of chips and particles.

Part of the clean output flow of the cyclonic separators 14 is delivered to the using machines by the pump 20 while the excess flow is delivered to the clean reservoir 44 via the line 21. The excess flow constitutes the cleanest coolant in the reservoir since that coolant has been subjected to the very good cleaning action of the cyclonic separators.

The underflow from the cyclonic separators 14 is discharged into the second drag tank 57 along with the swarf from the magnetic separator 35. Because the coolant in the second drag tank is relatively quiet, most of the particles in the underflow and the swarf sink to the bottom of the tank and are removed therefrom by the flights 60. The underflow thus is subjected to a first aftercleaning operation in order to dispose of a substantial quantity of particles in the underflow. Those particles which are not removed by the flights 60 flow out of the drag tank 57 through the trough 65 and are filtered by the filter web 67 so as to subject the underflow to a second aftercleaning operation and to remove virtually all of the particles therefrom. The coolant which passes through the web is directed into the clean reservoir 44 and mixes with the clean coolant from the bypass line 21 and the magnetic separator 35.

From the foregoing, it will be apparent that the present invention brings to the art new and improved cleaning apparatus 10 in which the coolant delivered to the cyclonic separator 14 is subjected to at least two precleaning operations and in which the underflow from the separators is subjected to at least two aftercleaning operations. Thus, wear of the pump 16 is reduced, the cyclonic separators operate with higher efficiency, and the particles from the underflow are disposed of without losing any significant amount of coolant.

It will be noted that the buckets 33, 61 and 83 for receiving all of the particles discharged by the apparatus 10 are located in the common collection area 25 at one end of the apparatus. Thus, all of the buckets can be conveniently picked up by a fork lift truck without need of maneuvering the truck to different collection areas. Also, the location of all three buckets in the common collection area 25 enables the apparatus 10 to occupy less floor space than would be the case if the buckets were spaced from one another around the apparatus. Of course, it should be realized that a single long bucket could be used to receive the discharge from the drag tanks 26 and 57 and to receive the dirty filter web 67 but the use of three separate buckets is preferred in order to facilitate lifting and emptying of the buckets.

We claim:

1. Apparatus for separating particles from liquid, said apparatus comprising first and second drag tanks located in spaced side-by-side relation, said first tank receiving a flow of dirty liquid from a using system, means within said first tank for picking up particles which settle to the bottom of the first tank and for discharging such particles out of one end of the first tank to a collection area at one end of said apparatus, a rotary magnetic separator located between said tanks, means defining a flow path from said first tank, thence beneath said separator and thence toward said one end of said apparatus whereby liquid in said first tank flows beneath and is partially cleaned by said separator by virtue of particles in such liquid being picked up by said separator, a reservoir for partially cleaned liquid located adjacent said one end of said apparatus and receiving the liquid cleaned by said separator and discharged from said flow path, means for scraping off the particles on said separator and for discharging said particles into said second tank, a cyclonic separator operable to receive a flow of partially cleaned liquid and to produce a flow of cleaner liquid and a dirty underflow, means for pumping partially cleaned liquid from said reservoir to said cyclonic separator, means for returning to said reservoir part of the liquid cleaned by said cyclonic separator and for delivering another part of such liquid to said using system, the underflow from said cyclonic separator being discharged into said second drag tank, means within said second tank for picking up particles which settle to the bottom of said second tank and for discharging such particles to said collection area at said one end of said apparatus, a web of porous filter media located between said tanks and adjacent said one end of said apparatus, said filter media being located above said reservoir, means defining a flow path from said second tank to the upper side of said filter media whereby liquid in said second tank flows to and then through said filter media and then flows to said reservoir while particles in such liquid are caught by said filter media, and means for periodically advancing said filter media toward said one end of said apparatus and into said collection area.

2. Apparatus as defined in claim 1 further including three buckets located in side-by-side relation in said collection area, one of the buckets receiving the particles discharged from said first tank, another of said buckets receiving said filter media and the particles caught thereon, and the other of said buckets receiving the particles discharged from said second tank.

3. Apparatus as defined in claim 1 further including a third tank located between said first and second drag tanks, said magnetic separator being located in said third tank.

4. Apparatus as defined in claim 3 in which said filter media is located in said third tank and adjacent one end of said magnetic separator.

5. Apparatus for separating particles from liquid, said apparatus comprising first and second drag tanks located in spaced side-by-side relation, said first tank receiving a flow of dirty liquid from a using system, means within said first tank for picking up particles which settle to the bottom of the first tank and for discharging such particles out of one end of the first tank to a collection area at one end of said apparatus, a rotary magnetic separator located between said tanks, means defining a flow path from said first tank and beneath said separator whereby liquid in said first tank flows beneath and is partially cleaned by said separator by virtue of particles in such liquid being picked up by said separator, a reservoir for partially cleaned liquid and receiving the liquid cleaned by said separator and discharged from said flow path, means for scraping off the particles on said separator and for discharging said particles into said second tank, a cyclonic separator operable to receive a flow of partially cleaned liquid and to produce a flow of cleaner liquid and a dirty underflow, means for pumping partially cleaned liquid from said reservoir to said cyclonic separator, means for delivering to said using system at least part of the liquid cleaned by said cyclonic separator, the underflow from said cyclonic separator being discharged into said second drag tank, means within said second tank for picking up particles which settle to the bottom of said second tank and for discharging such particles to said collection area, separating means located between said tanks and adjacent said one end of said apparatus, means defining a flow path from said second tank, thence to said separating means and thence to said reservoir whereby liquid in said second tank flows to and is partially cleaned by said separating means and then flows to said reservoir while particles in such liquid are picked up by the separating means, and means adjacent said one end of said apparatus and located in said collection area for receiving the particles picked up by said separating means.

* * * * *